(12) United States Patent
Ugawa et al.

(10) Patent No.: US 7,063,916 B2
(45) Date of Patent: Jun. 20, 2006

(54) BATTERY

(75) Inventors: Shinsaku Ugawa, Fukushima (JP); Hironobu Fukahori, Fukushima (JP)

(73) Assignee: Sony Corporation, Tokyo (JP)

( * ) Notice: Subject to any disclaimer, the term of this patent is extended or adjusted under 35 U.S.C. 154(b) by 79 days.

(21) Appl. No.: 10/791,936

(22) Filed: Mar. 3, 2004

(65) Prior Publication Data

US 2004/0265700 A1 Dec. 30, 2004

(30) Foreign Application Priority Data

Mar. 5, 2003 (JP) ............................ P2003-058756

(51) Int. Cl.
*H01M 4/64* (2006.01)
*H01M 10/40* (2006.01)

(52) U.S. Cl. ........................ 429/233; 429/94; 429/429; 429/331

(58) Field of Classification Search ...................... None

See application file for complete search history.

(56) References Cited

U.S. PATENT DOCUMENTS

| 6,869,723 | B1 * | 3/2005 | Yamaguchi | 429/94 |
| 2003/0170550 | A1 * | 9/2003 | Ugawa et al. | 429/331 |
| 2004/0121239 | A1 * | 6/2004 | Abe et al. | 429/326 |
| 2004/0146786 | A1 * | 7/2004 | Sato et al. | 429/326 |

\* cited by examiner

*Primary Examiner*—John S. Maples
(74) *Attorney, Agent, or Firm*—Sonnenschein Nath & Rosenthal LLP

(57) ABSTRACT

The invention provides a battery, which can improve a capacity and cycle characteristics. The battery comprises an electrode winding body, wherein a cathode and an anode are layered and wound with a separator in between inside a battery can. An electrolytic solution is impregnated in the separator. The electrolytic solution contains propylene carbonate, ethylene carbonate, a low viscosity solvent such as dimethyl carbonate, diethyl carbonate, and ethyl methyl carbonate, a carbonic acid ester of an unsaturated compound such as vinylethylene carbonate and vinylene carbonate, and a lithium salt. A content of the propylene carbonate is from 5 wt % to 20 wt %, and a content of the carbonic acid ester is from 0.3 wt % to 3 wt %.

3 Claims, 4 Drawing Sheets

BATTERY

RELATED APPLICATION DATA

The present application claims priority to Japanese Application(s) No(s). P2003-058756 filed March 5, 2003, which application(s) is/are incorporated herein by reference to the extent permitted by law.

BACKGROUND OF THE INVENTION

1. Field of the Invention

The present invention relates to a battery comprising a cathode, an anode, and an electrolyte.

2. Description of the Related Art

In recent years, many portable electronic devices such as a mobile phone and a laptop computer have been introduced. Downsizing and weight saving of these devices have been made. Along with these situations, as a portable power source for these electronic devices, a lithium ion secondary battery has attracted attention. Improvement of characteristics of the lithium ion secondary battery has been desired.

Therefore, recently, it has been reported that characteristics of the lithium ion secondary battery have been improved by using an electrolyte wherein ethylene carbonate or propylene carbonate which is electrochemically stable and has a high dielectric constant is used as a main solvent, and a low viscosity solvent having a superior ion conductivity such as dimethyl carbonate is thereto mixed (for example, refer to Japanese Unexamined Patent Application Publication No. H02-172162).

However, in the battery using this electrolyte, there has been a problem that its capacity deteriorates during the initial charge, and its capacity deteriorates after repeating high load charge and discharge.

SUMMARY OF THE INVENTION

The invention has been achieved in consideration of such a problem, and it is an object of the invention to provide a battery which can improve a capacity and cycle characteristics.

A battery according to the invention comprises a cathode; an anode; and an electrolyte, wherein the electrolyte contains propylene carbonate, ethylene carbonate, a low viscosity solvent having a boiling point of 150° C. or less, a carbonic acid ester of an unsaturated compound and a lithium salt, and a content of the propylene carbonate is from 5 wt % to 20 wt % and a content of the carbonic acid ester is from 0.3 wt % to 3 wt %.

In the battery according to the invention, the electrolyte contains the propylene carbonate, the ethylene carbonate, the low viscosity solvent and the carbonic acid ester of an unsaturated compound, and a content of the propylene carbonate and a content of the carbonic acid ester of an unsaturated compound are within given ranges. Therefore, its capacity and cycle characteristics are improved.

Other and further objects, features and advantages of the invention will appear more fully from the following description.

DETAILED DESCRIPTION OF THE PREFERRED EMBODIMENT

An embodiment of the invention will be described in detail hereinbelow with reference to the drawings.

Figure 1:
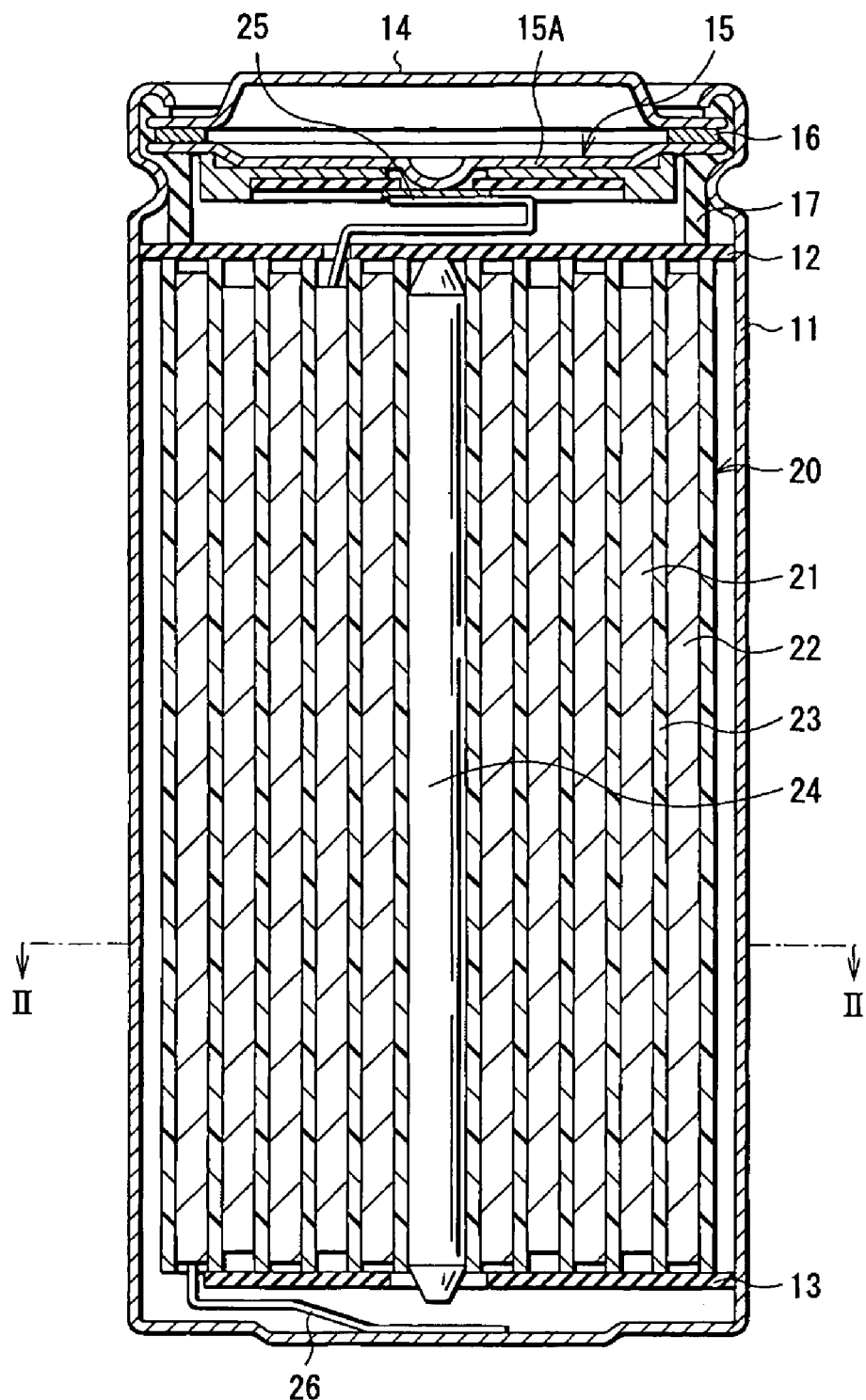
FIG. 1 is a cross sectional view which shows a construction of a secondary battery according to an embodiment of the invention.

FIG. 1 shows a cross sectional structure of a secondary battery according to the embodiment of the invention. This secondary battery is a so-called cylinder-type battery, and comprises an electrode winding body 20 inside a battery can 11 in the shape of an approximately hollow cylinder. The battery can 11 is made of, for example, iron (Fe) plated by nickel (Ni). One end of the battery can 11 is closed, and the other end thereof is opened. Inside the battery can 11, a pair of insulating plates 12 and 13 are respectively arranged so that the electrode winding body 20 is sandwiched between the insulating plates 12 and 13, and the insulating plates 12 and 13 are located perpendicular to the winding periphery face.

At the open end of the battery can 11, a battery cover 14 and a safety valve mechanism 15 and a PTC (Positive Temperature Coefficient) device 16 provided inside the battery cover 14 are mounted through caulking by a gasket 17. Inside of the battery can 11 is sealed. The battery cover 14 is, for example, made of a material similar to that of the battery can 11. The safety valve mechanism 15 is electrically connected to the battery cover 14 through the PTC device 16. When an inner pressure of the battery becomes a certain level or more by inner short circuit or exterior heating, a disk plate 15A flips to cut the electrical connection between the battery cover 14 and the electrode winding body 20. When a temperature rises, the PTC device 16 limits a current by increasing its resistance value to prevent abnormal heat generation by a large current. The PTC device 16 is made of, for example, barium titanate semiconductor ceramics. The gasket 17 is made of, for example, an insulating material and its surface is coated with asphalt.

Figure 2:
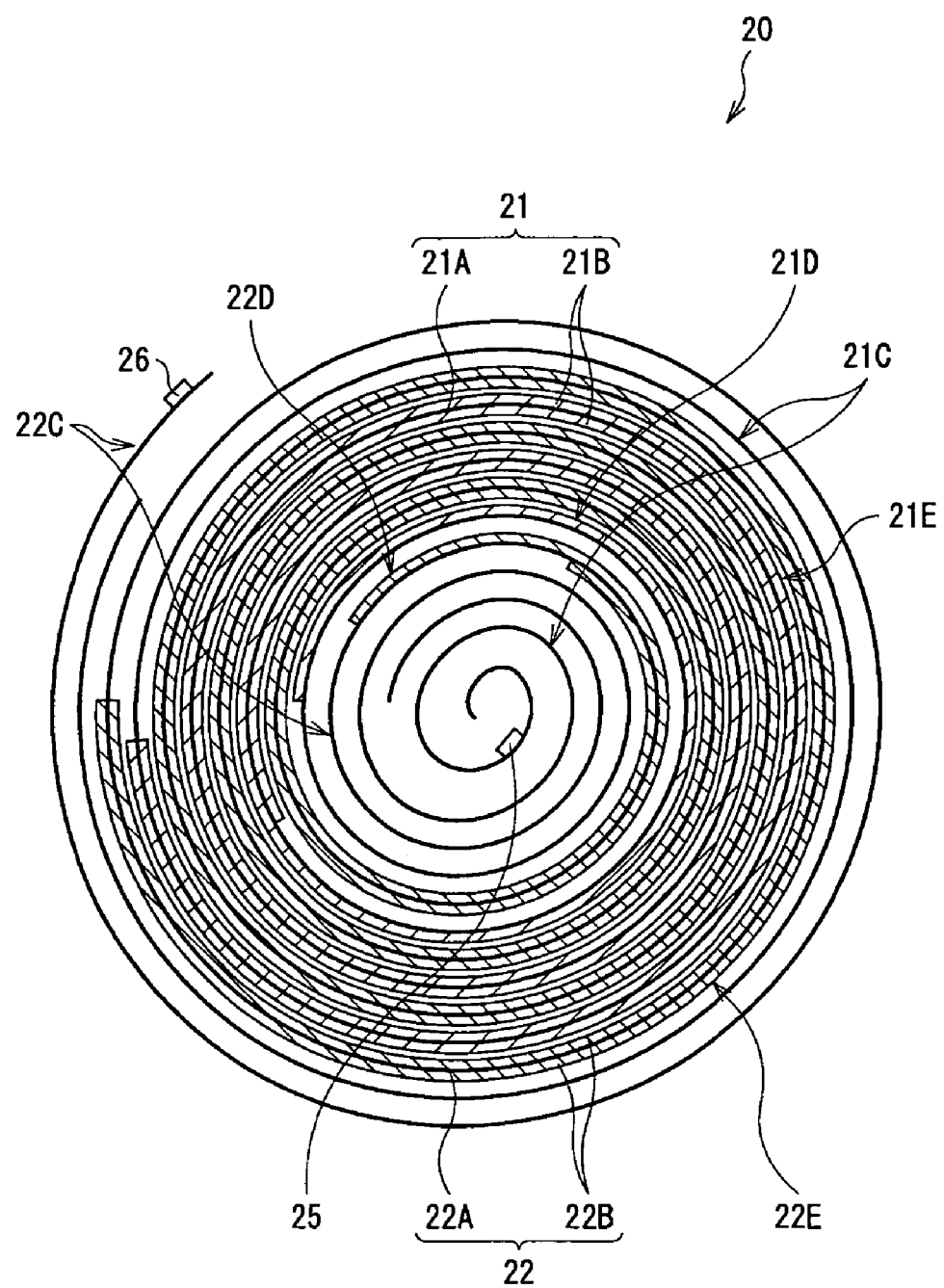
FIG. 2 is a cross sectional view which shows a construction taken along line II-II of an electrode winding body illustrated in FIG. 1.

FIG. 2 is a view showing a cross sectional structure taken along line II-II of the electrode winding body 20 illustrated in FIG. 1. The electrode winding body 20 is formed by layering and winding a strip-shaped cathode 21 and a strip-shaped anode 22 with a separator 23 in between. A center pin 24 is inserted in the center of the electrode winding body 20. In FIG. 2, the separator 23 is omitted. A cathode lead 25 made of aluminum (Al) or the like is connected to the cathode 21 of the electrode winding body 20. An anode lead 26 made of nickel or the like is connected to the anode 22. The cathode lead 25 is electrically connected to the battery cover 14 by being welded to the safety valve mechanism 15. The anode lead 26 is welded and electrically connected to the battery can 11.

The cathode 21 comprises, for example, a cathode current collector 21A and active material layer 21B provided on both sides or on a single side of the cathode current collector 21A. The cathode current collector 21A is made of, for example, aluminum, nickel, or stainless.

The active material layer 21B includes, for example, one or more cathode materials capable of inserting and extracting lithium as a cathode active material. In addition, the active material layer 21B can also include a conductive agent such as carbon materials and a binder such as polyvinylidene fluoride as necessary. As a cathode material capable of inserting and extracting lithium, for example, lithium complex oxides containing lithium and transition metals are preferable. Since the lithium complex oxide can generate a high voltage and have a high density, a high capacity can be obtained. As the lithium complex oxide, one which contains at least one from the group consisting of cobalt (Co), nickel, manganese (Mn), iron (Fe), vanadium (V), and titanium (Ti) as a transition metal is preferable. Concrete examples of the lithium complex oxide include $LiCoO_2$, $LiNiO_2$, $LiMn_2O_4$, $LiNi_{0.5}Co_{0.5}O_2$, and $LiNi_{0.5}Co_{0.3}Mn_{0.2}O_2$. In addition, phosphate compounds such as $LiFePO_4$ and $LiFe_{0.5}Mn_{0.5}PO_4$ can be also cited.

As the cathode 21 does, the anode 22 comprises, for example, an anode current collector 22A and active material layer 22B provided on both sides or on a single side of the anode current collector 22A. The anode current collector 22A is made of, for example, copper (Cu), nickel, or stainless.

The active material layer 22B includes, for example, one or more anode materials capable of inserting and extracting lithium as an anode active material. In addition, the active material layer 22B can also include a binder similar to in the cathode 21 as necessary. Examples of the anode material capable of inserting and extracting lithium include carbon materials, metal oxides, and high molecular weight materials. Examples of the carbon materials include artificial graphite, natural graphite, graphitizable carbon, and non-graphitizable carbon. Examples of the metal oxides include iron oxide, ruthenium oxide, molybdenum oxide, and tungstic oxide. Examples of the high molecular weight materials include polyacetylene and polypyrrole.

In addition, examples of the anode material capable of inserting and extracting lithium include simple substances, alloys, and compounds of metal elements or metalloid elements which can form an alloy with lithium. Examples of the alloys include alloys consisting of two or more metal elements and, in addition, alloys consisting of one or more metal elements and one or more metalloid elements. Examples of structures of the materials include a solid solution structure, a eutectic (eutectic mixture) structure, an intermetallic compound structure, and a concomitant state comprised of two or more of the foregoing structures.

Examples of the metal elements or the metalloid elements which can form an alloy with lithium include magnesium (Mg), boron (B), arsenic (As), aluminum (Al), gallium (Ga), indium (In), silicon (Si), germanium (Ge), tin (Sn), lead (Pb), antimony (Sb), bismuth (Bi), cadmium (Cd), silver (Ag), zinc (Zn), hafnium (Hf), zirconium (Zr), yttrium (Y), palladium (Pd) and platinum (Pt). Examples of alloys or compounds thereof include ones which are expressed by a chemical formula of $Ma_sMb_tLi_u$ or a chemical formula of $Ma_pMc_qMd_r$. In these chemical formulas, Ma represents at least one of metal elements and metalloid elements capable of forming an alloy with lithium, Mb represents at least one of metal elements and metalloid elements other than lithium and Ma, Mc represents at least one of nonmetallic elements, and Md represents at least one of metal elements and metalloid elements other than Ma. Values of s, t, u, p, q, and r satisfy $s>0$, $t\geq0$, $u\geq0$, $p>0$, $q>0$, and $r\geq0$, respectively.

Specially, simple substances, alloys, or compounds of metal elements or metalloid elements in Group 4B in the short period periodic table are preferable. Silicon and tin, or their alloys and compounds are particularly preferable. These materials can be crystalline or amorphous ones.

Concrete examples of such alloys and compounds include LiAl, AlSb, CuMgSb, $SiB_4$, $SiB_6$, $Mg_2Si$, $Mg_2Sn$, $Ni_2Si$, $TiSi_2$, $MoSi_2$, $CoSi_2$, $NiSi_2$, $CaSi_2$, $CrSi_2$, $Cu_5Si$, $FeSi_2$, $MnSi_2$, $NbSi_2$, $TaSi_2$, $VSi_2$, $WSi_2$, $ZnSi_2$, SiC, $Si_3N_4$, $Si_2N_2O$, $SiO_v$ ($0<v\leq2$), $SnO_w$ ($0<w\leq2$), $SnSiO_3$, LiSiO, and LiSnO.

In the secondary battery, the cathode 21 also comprises an exposed region 21C wherein no active material layer 21B is provided, an external active material region 21D wherein the active material layer 21B is provided only on the external side of the current collector 21A, and a both sides active material region 21E wherein the active material layer 21B are provided on both sides of the current collector 21A. The anode 22 also comprises an exposed region 22C wherein no active material layer 22B is provided, an external active material region 22D wherein the active material layer 22B is provided only on the external side of the current collector 22A, and a both sides active material region 22E wherein the active material layer 22B are provided on both sides of the current collector 22A. Regarding the exposed region 21C of the cathode 21, two or more circuits are provided at the center side of the winding body, and one or more circuits are provided at the peripheral side of the winding body. Regarding the exposed region 22C of the anode 22, one circuit or more are provided at the center side of the winding body and at the peripheral side of the winding body respectively. These exposed regions are intended to improve heat release characteristics, and promote thermal diffusion and improve safety by selectively generating short circuit at the center side of the winding body and the peripheral side of the winding body of the battery when pressurized from outside the battery. In particular, when the anode 22 exists inside the cathode 21, it is possible that a welding trace of the cathode lead 25 penetrates the separator 23 to generate short circuit. Therefore, regarding the exposed region 21C at the center side of the winding body, one or more circuit is additionally provided compared to the exposed region 22C. Regarding the external active material region 21D, nearly one circuit is provided at the center side of the winding body. The external active material region 22D is provided at the center side of the winding body.

Figure 3:
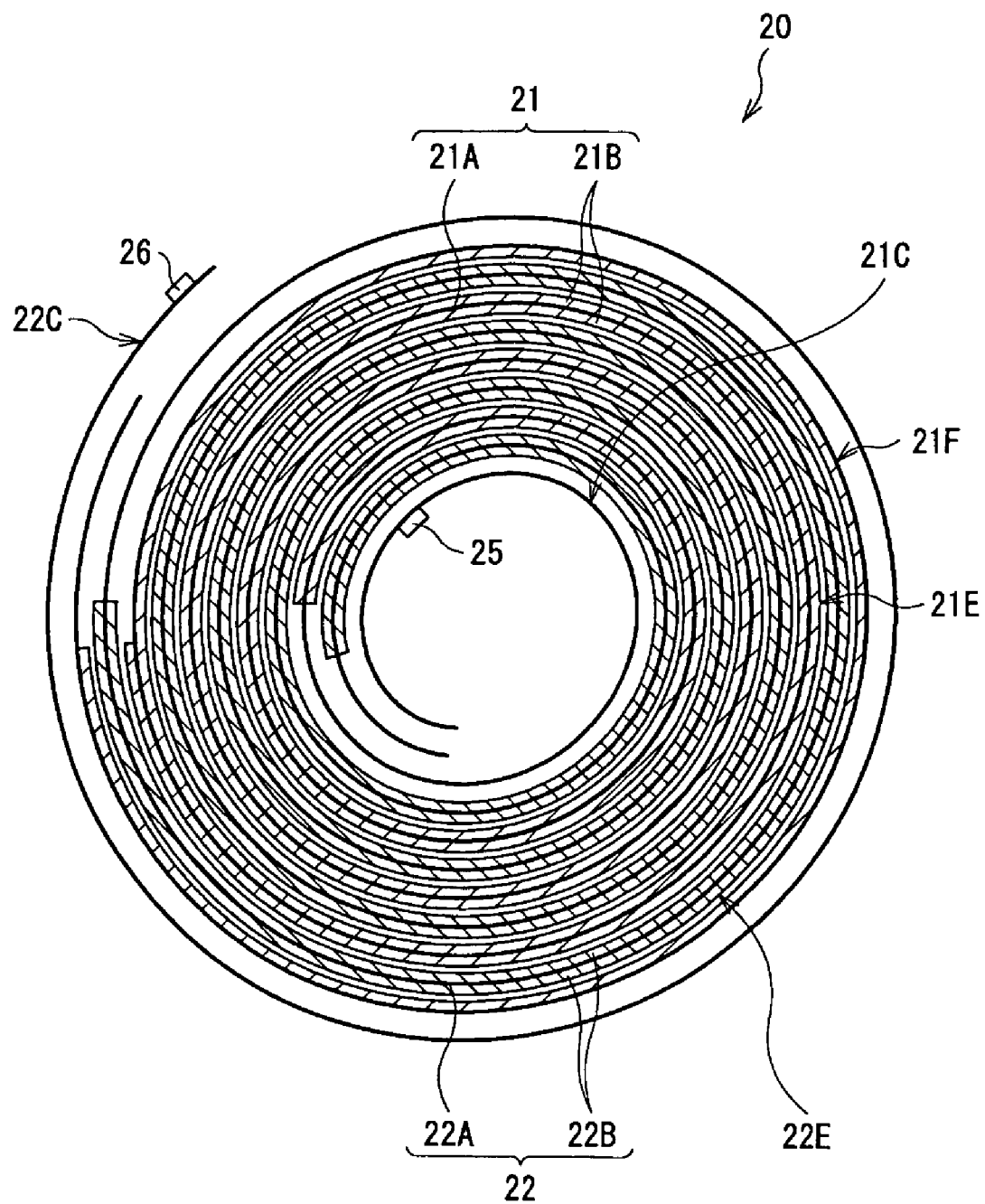
FIG. 3 is a cross sectional view which shows other construction taken along line II-II of the electrode winding body illustrated in FIG. 1.

As shown in FIG. 3, regarding the cathode 21, the exposed region 21C can be two circuits or less if one circuit or more of the exposed region 21C are provided at the center side of the winding body. Regarding the anode 22, it is not necessary one or more circuits of the exposed region 22C are provided at the center side of the winding body. Further, it is possible that the cathode 21 comprises an internal active material region 21F wherein the active material layer 21B is provided only at the internal side of the current collector 21A at the center side of the winding body, and the internal active material region 21F is arranged to face the exposed region 22C of the anode 22C provided at the peripheral side of the winding body. In this case, it is also possible to fully improve the heat release characteristics and secure safety. In FIG. 3, the separator 23 is omitted.

The separator 23 is constructed of, for example, a porous film made of a polyolefin material such as polypropylene and polyethylene, or a porous film made of an inorganic material such as a ceramics nonwoven cloth. The separator 23 can have a structure in which two or more of the foregoing porous films are layered.

An electrolytic solution, a liquid electrolyte is impregnated in this separator 23. The electrolytic solution contains, for example, a solvent and a lithium salt of an electrolyte salt dissolved in this solvent. The solvent is intended to separate the electrolyte salt. The solvent contains propylene carbonate, ethylene carbonate, and a low viscosity having a boiling point of 150° C. or less at the atmospheric pressure. Propylene carbonate and ethylene carbonate are electrochemically stable and have a high dielectric constant. In addition, when propylene carbonate and ethylene carbonate coexist, they can improve their characteristics by interaction between each other. In particular, propylene carbonate can improve low temperature characteristics since its melting point is law of about −49° C. at the atmospheric pressure. However, when only propylene carbonate is used without ethylene carbonate, ion conductivity at low temperatures is lowered. A content of propylene carbonate in the electrolytic solution is from 5 wt % to 20 wt %. When the content of propylene carbonate is under 5 wt %, low temperature characteristics are lowered. Meanwhile, when the content of propylene carbonate is over 20 wt %, not all decomposition of propylene carbonate in the anode 22 during the initial charge can be inhibited by a coat formed by carbonic acid ester of an unsaturated compound described below, and a capacity is lowered.

As a low viscosity solvent, ethyl methyl carbonate, dimethyl carbonate, or diethyl carbonate is preferable.

As a solvent, only propylene carbonate, ethylene carbonate, and the low viscosity carbonate can be contained. However, other solvent can be also contained to obtain characteristics corresponding to respective objectives.

Examples of other solvent include 1,2-dimethoxy ethane, 1,2-diethoxy ethane, γ-butyrolactone, tetrahydrofuran, 2-methyltetrahydrofuran, 1,3-dioxolane, 4-methyl-1,3-dioxolane, diethyl ether, sulfolane (tetrahydrothiophen 1,1-dioxide), methyl sulfolane, acetonitrile, propionitrile, anisole, ester acetate, ester butyrate, and ester propionate.

Examples of the lithium salt include $LiClO_4$, $LiAsF_6$, $LiPF_6$, $LiBF_4$, $LiB(C_6H_5)_4$, $LiCH_3SO_3$, $LiCF_3SO_3$, LiCl, and LiBr. One of the above or a mixture of two or more of the above can be used as a lithium salt.

This electrolytic solution also contains a carbonic acid ester of an unsaturated compound as an additive. A content of the carbonic acid ester in the electrolytic solution is from 0.3 wt % to 3 wt %. The carbonic acid ester of an unsaturated compound forms a fine coat on the surface of the cathode 22 during the initial charge, and inhibits decomposition reaction of the electrolytic solution. When a content of the carbonic acid ester is small, this function cannot fully work. Meanwhile, a content of the carbonic acid ester is large, the coat becomes thick to worsen the battery characteristics. The carbonic acid ester of an unsaturated compound also has a function to inhibit dissolution of the current collector 22A into the electrolytic solution by forming the foregoing coat. In this embodiment, as mentioned above, the exposed regions 21C and 22C are provided to improve safety. However, even when high load discharge is performed, dissolution of the current collector 22A into the electrolytic solution can be inhibited.

As a carbonic acid ester of an unsaturated compound, vinylethylene carbonate or vinylene carbonate is preferable. One of the above or a mixture of the above can be used as an additive.

The carbonic acid ester of an unsaturated compound also functions as a solvent. However, in this specification, the carbonic acid ester is described as an additive by focusing on the foregoing function. Needless to say, it is enough that at least part of added carbonic acid ester contributes to the foregoing reaction. Part of the added carbonic acid ester which does not contribute to the reaction can function as a solvent.

This secondary battery can be manufactured, for example, as follows.

First, for example, a cathode active material capable of inserting and extracting lithium, a conductive agent, and a binder are mixed to prepare a cathode mixture. The cathode mixture is dispersed in a solvent such as N-methyl-2-pyrrolidone to obtain a cathode mixture slurry. Next, this cathode mixture slurry is applied to the cathode current collector 21A, dried, and compression-molded to form the active material layer 21B. In result, the cathode 21 is fabricated.

Further, an anode material capable of inserting and extracting lithium and a binder are mixed to prepare an anode mixture. The anode mixture is dispersed in a solvent such as N-methyl-2-pyrrolidone to obtain an anode mixture slurry. Next, this anode mixture slurry is applied to the anode current collector 22A, dried, and compression-molded to form the active material layer 22B. In result, the anode 22 is fabricated.

Subsequently, the cathode lead 25 is attached on the cathode current collector 21A by welding or the like and the anode lead 26 is attached on the anode current collector 22A by welding or the like. After that, the cathode 21 and the anode 22 are layered and wound with the separator 23 in between. An end of the cathode lead 25 is welded to the safety valve mechanism 15, and an end of the anode lead 26 is welded to the battery can 11. The wound cathode 21 and anode 22 are sandwiched between the pair of insulating plates 12 and 13, and the cathode 21 and the anode 22 are thereby housed inside the battery can 11. After housing the cathode 21 and the anode 22 inside the battery can 11, the electrolytic solution is injected inside the battery can 11, and impregnated in the separator 23. After that, at the open end of the battery can 11, the battery cover 14, the safety valve mechanism 15, and the PTC device 16 are fixed by caulking the gasket 17. The secondary battery shown in FIG. 1 is thereby completed.

In this secondary battery, when charged, lithium ions are extracted from the cathode 21, and are inserted in the anode 22 through the electrolytic solution. When discharged, for example, lithium ions are extracted from the anode 22, and are inserted in the cathode 21 through the electrolytic solution. In this case, the electrolytic solution contains propylene carbonate, ethylene carbonate, the low viscosity solvent and the carbonic acid ester of an unsaturated compound, and contents of propylene carbonate and the carbonic acid ester of an unsaturated compound are within the respective given ranges. Therefore, chemical stability is improved. Consequently, excellent capacity, cycle characteristics, and low temperature characteristics can be obtained.

As above, according to this embodiment, the electrolyte contains propylene carbonate, ethylene carbonate, the low viscosity solvent, and the carbonic acid ester of an unsaturated compound. In addition, a content of propylene carbonate is from 5 wt % to 20 wt %, and a content of the carbonic acid ester is from 0.3 wt % to 3 wt %. Therefore, a capacity, cycle characteristics, and low temperature characteristics can be improved.

Further, the coat is formed on the cathode 22 by the carbonic acid ester of an unsaturated compound. Therefore, even when one or more circuits of the exposed regions 21C and 22C are provided, excellent high load characteristics can be obtained.

EXAMPLES

Further, descriptions will be given in detail of concrete examples of the invention.

Examples 1-1 to 1-4

As Examples 1-1 to 1-4 and Comparative examples 1-1 to 1-14, secondary batteries explained in the embodiment were fabricated. In this case, a structure of the electrode winding body 20 was one shown in FIG. 3. As an electrolytic solution, a mixture of propylene carbonate (PC), ethylene carbonate (EC), dimethyl carbonate (DMC) of a low viscosity solvent, $LiPF_6$ of an electrolyte salt, and vinylethylene carbonate (VEC) of a carbonic acid ester of an unsaturated compound was used. Contents of propylene carbonate, ethylene carbonate, dimethyl carbonate, $LiPF_6$, and vinylethylene carbonate in the electrolytic solution were changed as shown in Examples 1-1 to 1-4 and Comparative examples 1-1 to 1-14 in Table 1.

TABLE 1

| | Composition of electrolytic solution (wt %) | | | | | Initial capacity (%) | Capacity retention ratio (%) | Capacity at 0° C./ capacity at 23° C. (%) |
|---|---|---|---|---|---|---|---|---|
| | PC | EC | DMC | $LiPF_6$ | VEC | | | |
| Example 1-1 | 5 | 15 | 63.7 | 16 | 0.3 | 102 | 92 | 90 |
| Example 1-2 | 20 | 15 | 48.7 | 16 | 0.3 | 102 | 93 | 90 |
| Example 1-3 | 5 | 15 | 61 | 16 | 3 | 102 | 94 | 89 |
| Example 1-4 | 20 | 15 | 46 | 16 | 3 | 102 | 93 | 88 |
| Comparative example 1-1 | 0 | 15 | 69 | 16 | 0 | 100 | 65 | 80 |
| Comparative example 1-2 | 5 | 15 | 64 | 16 | 0 | 100 | 70 | 91 |
| Comparative example 1-3 | 20 | 15 | 49 | 16 | 0 | 105 | 71 | 91 |
| Comparative example 1-4 | 30 | 15 | 39 | 16 | 0 | 90 | 71 | 92 |
| Comparative example 1-5 | 0 | 15 | 68.7 | 16 | 0.3 | 102 | 85 | 79 |
| Comparative example 1-6 | 30 | 15 | 38.7 | 16 | 0.3 | 95 | 90 | 91 |
| Comparative example 1-7 | 0 | 15 | 66 | 16 | 3 | 102 | 83 | 78 |
| Comparative example 1-8 | 30 | 15 | 34 | 16 | 3 | 95 | 92 | 89 |
| Comparative example 1-9 | 0 | 15 | 64 | 16 | 5 | 102 | 74 | 60 |
| Comparative example 1-10 | 5 | 15 | 59 | 16 | 5 | 102 | 80 | 68 |
| Comparative example 1-11 | 20 | 15 | 44 | 16 | 5 | 102 | 81 | 71 |
| Comparative example 1-12 | 30 | 15 | 34 | 16 | 5 | 95 | 78 | 70 |
| Comparative example 1-13 | 20 | 0 | 61 | 16 | 3 | 95 | 68 | 91 |
| Comparative example 1-14 | 20 | 16 | 0 | 16 | 3 | 50 | 45 | 85 |

Regarding the fabricated secondary batteries of Examples 1-1 to 1-4 and Comparative examples 1-1 to 1-14, initial capacities, cycle characteristics, and low temperature characteristics were examined.

Initial capacities and cycle characteristics were obtained by performing charge and discharge. The initial capacity is a discharge capacity obtained in the first charge and discharge. As cycle characteristics, a capacity retention ratio was found as a ratio of a discharge capacity at 200th cycle in relation to the initial capacity. Charge and discharge was performed by firstly performing charge for 2 hours at 23° C. by setting a battery voltage to 4.2 V at a constant current of 1 C, and then performing discharge at a constant current of 1 C until a battery voltage reached 2.5. 1 C means a current value with which the initial capacity is discharged in 1 hour. Obtained results are shown in Table 1. In Table 1, initial capacity values of Examples 1-1 to 1-4 and Comparative examples 1-2 to 1-14 are relative values when the initial capacity of Comparative example 1-1 is 100.

Low temperature discharge characteristics were found as follows. First, charge and discharge was performed at 23° C. to find a capacity at 23° C. Next, after charge was performed at 23° C. again, discharge was performed at 0° C. to obtain a capacity at 0° C. After that, low temperature discharge characteristics were found as a ratio of a capacity at 0° C. in relation to a capacity at 23° C., that is as (Capacity at 0° C./capacity at 23° C.)×100. The charge and discharge was performed under the same conditions as those in obtaining the cycle characteristics. Obtained results are shown in Table 1.

As evidenced by Table 1, in Comparative examples 1-1 to 1-4, wherein a content of vinylethylene carbonate was 0 wt %, and Comparative examples 1-9 to 1-12, wherein a content of vinylethylene carbonate was 5 wt %, capacity retention ratios were as law as 80% or less. In particular, in Comparative examples 1-9 to 1-12, (Capacity at 0° C./capacity at 23° C.) were also as low as 71% or less. Meanwhile, in Examples 1-1 to 1-4, wherein a content of vinylethylene carbonate was from 0.3 wt % to 3 wt %, both capacity retention ratios and (Capacity at 0° C./capacity at 23° C.) were as high as 92% or more and 88% or more, respectively. The reason thereof is thought as follows. That is, when a content of vinylethylene carbonate was from 0.3 wt % to 3 wt %, a fine coat was formed on the cathode 22 during the initial charge. Meanwhile, when a content of vinylethylene carbonate was over 3 wt %, a coat became thick, and vinylethylene carbonate having a low melting point did not form the coat and remained in the electrolytic solution.

Further, in Comparative examples 1-4, 1-6, 1-8, and 1-12, wherein a content of propylene carbonate was 30 wt %, the initial capacity was as low as 95% or less. The reason thereof is thought as follows. That is, when vinylethylene carbonate exists, decomposition of propylene carbonate in the anode 22 is inhibited during the initial charge due to the foregoing reason. However, when a content of vinylethylene carbonate is about 5 wt %, not all decomposition of propylene carbonate in the anode 22 can be inhibited if a content of propylene carbonate becomes over 20 wt %.

Meanwhile, in Comparative examples 1-1, 1-5, 1-7, and 1-9, wherein propylene carbonate was not contained, both capacity retention ratios and (Capacity at 0° C./capacity at 23° C.) were as low as 85% or less and 80% or less, respectively. The reason of lowered (Capacity at 0° C./capacity at 23° C.) is thought as follows. That is, since there was no propylene carbonate having a low melting point, the solvent did not function effectively.

Further, in Comparative example 1-13, wherein ethylene carbonate was not contained, both the initial capacity and the capacity retention ratio were as low as 95% and 68%, respectively. The reason of the low capacity retention ratio is thought as follows. That is, from the point of view that capacity retention ratios were also low in Comparative examples 1-1, 1-5, 1-7, and 1-9, wherein no propylene carbonate was contained, the fine maintenance rate can be obtained by interaction from coexistence of ethylene carbonate and propylene carbonate.

In addition, in Comparative example 1-14, wherein no dimethyl carbonate was contained, both the initial capacity and the capacity retention ratio were as low as 50% and 45%, respectively. The reason thereof is thought as follows. That is, since dimethyl carbonate was not used, a viscosity of the electrolytic solution became high, and a movement speed of the ions in the electrolytic solution became low.

That is, it was found that when an electrolytic solution contains propylene carbonate, ethylene carbonate, dimethyl carbonate, and vinylethylene carbonate, and contents of propylene carbonate and vinylethylene carbonate are from 5 wt % to 20 wt % and from 0.3 wt % to 3 wt %, respectively, a capacity, cycle characteristics, and low temperature characteristics can be all improved.

Examples 2-1 and 2-2

Secondary batteries were fabricated in a manner similar to in Example 1-4, except that ethyl methyl carbonate (EMC) or diethyl carbonate (DEC) was used instead of dimethyl carbonate. Regarding the secondary batteries of Examples 2-1 and 2-2, initial capacities, cycle characteristics, and low temperature characteristics were examined in a manner similar to in Example 1-4. The results are shown in Table 2 along with the results of Example 1-4 and Comparative example 1-14.

As evidenced by Table 2, according to Examples 2-1 and 2-2, wherein ethyl methyl carbonate or diethyl carbonate was used, regarding initial capacities and capacity retention ratios, higher values were obtained compared to in Comparative example 1-14 as in Example 1-4, wherein dimethyl carbonate was used. That is, it was found that the similar result could be obtained when other low viscosity solvents were used.

Examples 3-1 and 3-2

As Examples 3-1 and 3-2 and Comparative example 3-1, secondary batteries were fabricated in a manner similar to in Examples 1-2 and 1-4, except that vinylene carbonate (VC) was used instead of vinylethylene carbonate, and contents of vinylene carbonate were changed as shown in Table 3. Regarding the secondary batteries of Examples 3-1 and 3-2, and Comparative example 3-1, initial capacities, cycle characteristics, and low temperature characteristics were examined in a manner similar to in Examples 1-2 and 1-4. The results are shown in Table 3 along with the results of Examples 1-2 and 1-4 and Comparative example 1-11.

TABLE 2

|  | Composition of electrolytic solution (wt %) | | | | | | | Initial capacity (%) | Capacity retention ratio (%) | Capacity at 0° C./capacity at 23° C. (%) |
| --- | --- | --- | --- | --- | --- | --- | --- | --- | --- | --- |
|  | PC | EC | DMC | EMC | DEC | $LiPF_6$ | VEC | | | |
| Example 1-4 | 20 | 15 | 46 | 0 | 0 | 16 | 3 | 102 | 93 | 88 |
| Example 2-1 | 20 | 15 | 0 | 46 | 0 | 16 | 3 | 101 | 90 | 87 |
| Example 2-2 | 20 | 15 | 0 | 0 | 46 | 16 | 3 | 100 | 89 | 87 |
| Comparative example 1-14 | 20 | 16 | 0 | 0 | 0 | 16 | 3 | 50 | 45 | 85 |

TABLE 3

|  | Composition of electrolytic solution (wt %) | | | | | | Initial capacity (%) | Capacity retention ratio (%) | Capacity at 0° C./capacity at 23° C. (%) |
| --- | --- | --- | --- | --- | --- | --- | --- | --- | --- |
|  | PC | EC | DMC | $LiPF_6$ | VEC | VC | | | |
| Example 1-2 | 20 | 15 | 48.7 | 16 | 0.3 | 0 | 102 | 93 | 90 |
| Example 1-4 | 20 | 15 | 46 | 16 | 3 | 0 | 102 | 93 | 88 |
| Example 3-1 | 20 | 15 | 48.7 | 16 | 0 | 0.3 | 102 | 93 | 90 |
| Example 3-2 | 20 | 15 | 46 | 16 | 0 | 3 | 102 | 93 | 88 |
| Comparative example 1-11 | 20 | 15 | 44 | 16 | 5 | 0 | 102 | 81 | 71 |
| Comparative example 3-1 | 20 | 15 | 44 | 16 | 0 | 5 | 102 | 81 | 71 |

As evidenced by Table 3, initial capacities, capacity retention ratios and (Capacity at 0° C./capacity at 23° C.) of Examples 3-1 and 3-2 and Comparative example 3-1, wherein vinylene carbonate was used were respectively similar to those of Examples 1-2 and 1-4 and Comparative examples 1-1, wherein vinylethylene carbonate was used. That is, it was found that when other carbonic acid ester of an unsaturated compound was used, the similar results could be obtained.

Examples 4-1 and 4-2

Figure 4:
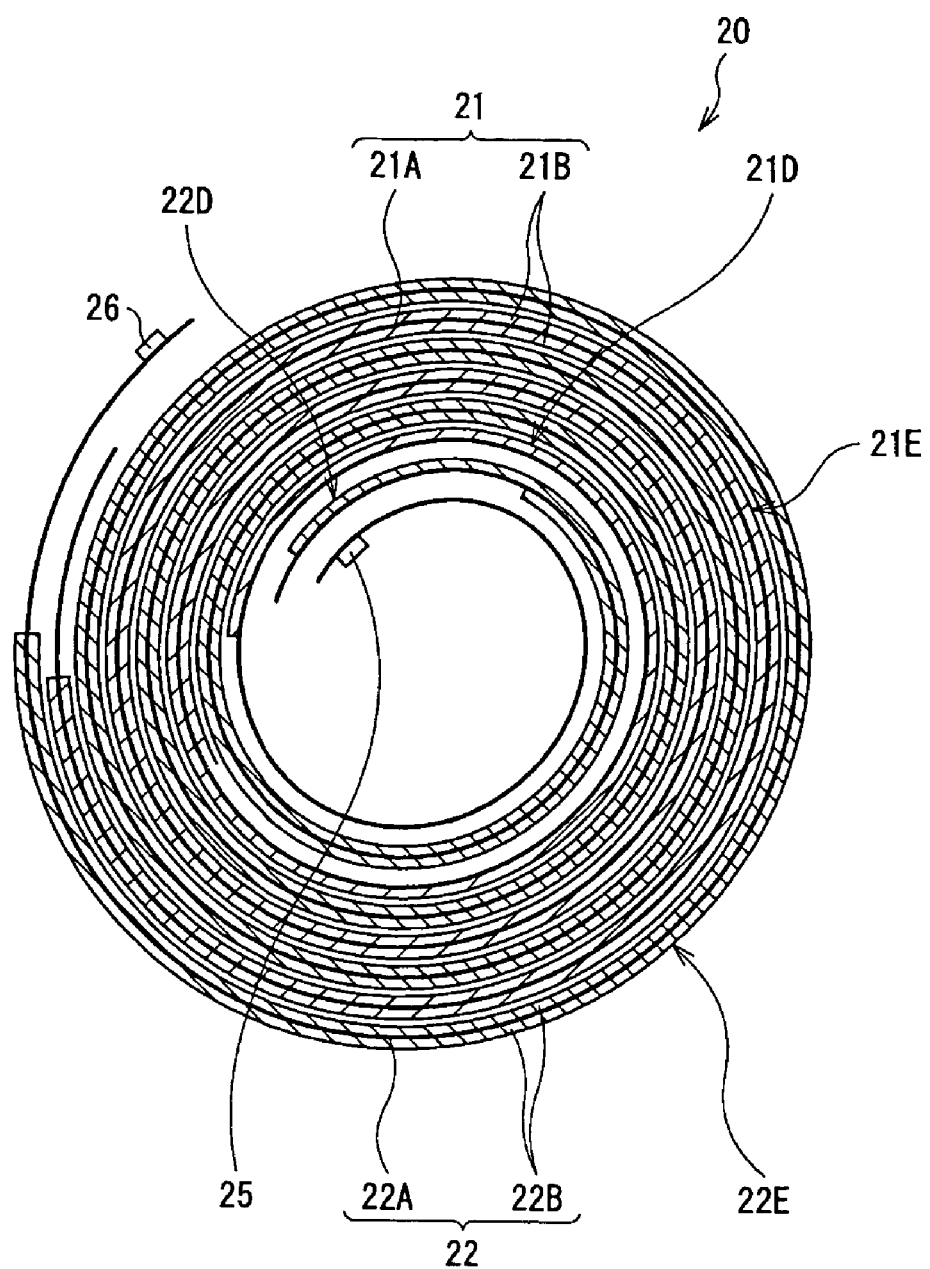
FIG. 4 is a cross sectional view which shows a construction of the electrode winding body according to an example of the invention.

As Examples 4-1 and 4-2 and Comparative example 4-1 and 4-2, secondary batteries were fabricated in a manner similar to in Example 1-4 and Comparative example 1-3, except that other structure was used as a structure of the electrode winding body 20. The structure of the winding body 20 in Example 4-1 and Comparative example 4-1 was the structure explained in the embodiment as shown in FIG. 2. The structure of the winding body 20 in Example 4-2 and Comparative example 4-2 was the structure shown in FIG. 4. The electrode winding body 20 shown in FIG. 4 has the same structure as shown in FIG. 2, except that one or more circuits of the exposed regions 21C and 22C of the current collectors 21A and 22A are not provided at the center side and the peripheral side. In FIG. 4, same symbols are used for the same components as in FIGS. 2 and 3.

Regarding the secondary batteries of Examples 1-3,4-1, and 4-2 and Comparative examples 1-3,4-1, and 4-2, an overcharge nail test was conducted to examine heat generation due to inner short circuit as follows. First, charge was performed at 23° C. at a current value of 1 C until a battery voltage reached 4.2 V, 4.3 V, 4.4 V, and 4.5 V to generate an overcharge state. Next, a nail having a diameter of 3 mm was put through in the central part of the lateral face of the battery in this overcharge state so that the nail becomes perpendicular to the winding periphery face. After that, the battery was left until its temperature reached normal temperatures, and examined the duration. In this regard, when the duration was 5 minutes or less, it was judged as high safety, and when the duration was over 5 minutes, it was judged as low safety. The results are also shown in Table 4. In Table 4, ◯ means high safety, and x means low safety. The nail test is conducted on the assumption of a heavy inner short circuit. However, batteries are constructed so that safety can be secured up to about 4.3 V since overcharge is prevented by a protective circuit or the like generally.

Further, regarding the secondary batteries of Examples 1-3,4-1, and 4-2 and Comparative examples 1-3,4-1, and 4-2, an over discharge test was conducted as follows. First, charge was performed until a battery voltage reached 4.2 V Mter that, the battery was left in this state with a resistance of 2 Ω for 2 days. Next, discharge was performed at a constant current of 1 C until a battery voltage reached 2.5 V to obtain a discharge capacity after over discharge. Then, as a recovery rate, a discharge capacity ratio after over discharge in relation to the initial capacity obtained by performing charge and discharge was obtained under the same conditions as in obtaining cycle characteristics. The results are shown in Table 4.

TABLE 4

| | Composition of electrolytic solution (wt %) | | | | | Structure of electrode winding body | Nail test | | | | Recovery rate (%) |
|---|---|---|---|---|---|---|---|---|---|---|---|
| | PC | EC | DMC | LiPF$_6$ | VEC | | 4.2 V | 4.3 V | 4.4 V | 4.5 V | |
| Example 1-4 | 20 | 15 | 46 | 16 | 3 | FIG. 3 | ◯ | ◯ | ◯ | X | 97 |
| Example 4-1 | 20 | 15 | 46 | 16 | 3 | FIG. 2 | ◯ | ◯ | ◯ | ◯ | 98 |
| Example 4-2 | 20 | 15 | 46 | 16 | 3 | FIG. 4 | ◯ | ◯ | X | X | 99 |
| Comparative example 1-3 | 20 | 15 | 49 | 16 | 0 | FIG. 3 | ◯ | ◯ | ◯ | X | 78 |
| Comparative example 4-1 | 20 | 15 | 49 | 16 | 0 | FIG. 2 | ◯ | ◯ | ◯ | ◯ | 80 |
| Comparative example 4-2 | 20 | 15 | 49 | 16 | 0 | FIG. 4 | ◯ | ◯ | X | X | 95 |

As evidenced by Table 4, in Examples 1-4 and 4-1 and Comparative examples 1-3 and 4-1, safety in relation to the nail test could be improved compared to in Example 4-2 and Comparative example 4-2. In particular, the effectiveness was larger in Example 4-1 and Comparative example 4-1. The reason thereof is likely that heat generation characteristics were improved, and heat dispersion was promoted by selective short circuit between the current collector 21A and the current collector 22A at the center side and the peripheral side of the winding body 20 when driving a nail.

As evidenced by Table 4, however, in Comparative examples 1-3 and 4-1, recovery rates deteriorated. Such deterioration of recovery rates is likely caused by dissolution of the anode current collector in the electrolytic solution when potential of the anode 22 was raised during over discharge. Meanwhile, in Example 4-2 and Comparative example 4-2, recovery rates did not deteriorate. The reason thereof is as follows. That is, in Example 4-2 and Comparative example 4-2, the exposed region 22C was little provided, and the current collector 22A was covered by the active material layer 22B. Therefore, a dissolution rate of the current collector 22A into the electrolytic solution became low. Meanwhile, in Examples 1-4 and 4-1, recovery rates were high despite that the exposed region 22C of the current collector 22A was provided at the center side and the peripheral side as in Comparative examples 1-3 and 4-1. The reason thereof is likely that the carbonic acid ester of an unsaturated compound formed a coat on the anode 22 in the initial charge, and this coat prevented dissolution of the current collector 22A.

That is, it was found that when an electrolytic solution contains propylene carbonate, ethylene carbonate, a low viscosity solvent and a carbonic acid ester of an unsaturated compound, and contents of propylene carbonate and the carbonic acid ester are from 5 wt % to 20 wt % and from 0.3 wt % to 3 wt %, respectively, safety can be further improved even if the exposed regions 21C and 22C are provided at the center side and the peripheral side of the winding body since deterioration due to over discharge can be inhibited.

While the invention has been described with reference to the embodiment and Examples, the invention is not limited to the foregoing embodiment and Examples, and various modifications may be made. For example, though in the foregoing embodiment and Examples, a case using the electrolytic solution, which is the liquid electrolyte, has been described. However, other electrolyte can be used instead of the electrolytic solution. Examples of other electrolyte include a gelatinous electrolyte wherein an electrolytic solution is held in a high molecular weight compound, a mixture of a solid electrolyte having ion conductivity and an electrolytic solution, and a mixture of a solid electrolyte and a gelatinous electrolyte.

As a gelatinous electrolyte, various high molecular weight compounds that absorb and gel the electrolytic solution can be used. Examples of such high molecular weight compounds include fluoro high molecular weight compounds such as polyvinylidene fluoride and a copolymer of vinylidene fluoride and hexafluoro propylene, ether high molecular weight compounds such as polyethylene oxide and a cross-linked complex including polyethylene oxide, and polyacrylonitrile. In particular, in the view of redox stability, the fluoro high molecular weight compounds are desirable.

As a solid electrolyte, for example, an organic solid electrolyte wherein an electrolyte salt is dispersed in a high molecular weight compound having an ion conductivity, or an inorganic solid electrolyte comprised of an ion conductive glass or an ionic crystal can be used. In this regard, as a high molecular weight compound, for example, an ether high molecular weight compound such as polyethylene oxide and a cross-linked complex including polyethylene oxide, an ester high molecular weight compound such as polymethacrylate, and an acrylate high molecular weight compound can be used by itself, by mixing them, or by copolymerizing them in the molecules. As an inorganic solid electrolyte, lithium nitride, lithium iodide or the like can be used.

In the foregoing embodiment and Examples, the structures of the electrode winding body 20 have been explained by using concrete examples. However, the invention can be applied to cases using other structures. Further, the invention can be applied to a secondary battery having a winding structure in the shape of an oval or a polygon, and a secondary battery having a structure wherein a cathode and an anode are folded or layered as well. In addition, the invention can be applied to a secondary battery in the shape of a coin, a button, or a card. Furthermore, the invention can be applied to primary batteries instead of the secondary batteries.

As described above, according to the battery of the invention, the electrolyte contains propylene carbonate, ethylene carbonate, a low viscosity solvent having a boiling point of 150° C. or less, and a carbonic acid ester of an unsaturated compound. In addition, a content of propylene carbonate is from 5 wt % to 20 wt %, and a content of the carbonic acid ester is from 0.3 wt % to 3 wt %. Therefore, a capacity, cycle characteristics, and low temperature characteristics can be improved.

Obviously many modifications and variations of the present invention are possible in the light of the above teachings. It is therefore to be understood that within the scope of the appended claims the invention may be practiced otherwise than as specifically described.

What is claimed is:

1. A battery comprising:
   a cathode comprising a cathode current collector, an external cathode region having an active material layer only on the external side of the cathode current collector, an exposed cathode region wherein no active material layer is provided, and a both sides cathode region having an active material layer on both sides of the cathode current collector;
   an anode comprising an anode current collector, an external anode region having an active material layer only on the external side of the anode current collector, an exposed anode region wherein no active material layer is provided, and a both sides anode region having an active material layer on both sides of the anode current collector; and
   an electrolyte
   comprising propylene carbonate, ethylene carbonate, a low viscosity solvent having a boiling point of 150° C. or less, a carbonic acid ester of an unsaturated compound and a lithium salt; and a content of the propylene carbonate is from 5 wt % to 20 wt %, and a content of the carbonic acid ester is from 0.3 wt % to 3 wt %.

2. A battery according to claim 1, wherein the electrolyte contains at least either ethyl methyl carbonate, dimethyl carbonate, or diethyl carbonate as a low viscosity solvent.

3. A battery according to claim 1, wherein the cathode and the anode are layered and wound with the electrolyte in between to form a winding body; and at least either the cathode or the anode comprises one or more circuits of an exposed region wherein no active material layer is provided at least either at a center side of the winding body or at a peripheral side of the winding body.

* * * * *